United States Patent [19]

Aubrey

[11] Patent Number: 5,191,195
[45] Date of Patent: Mar. 2, 1993

[54] FARE CARD READ-WRITER WHICH OVERWRITES OLDEST OR INVALID DATA

[75] Inventor: Kenneth R. Aubrey, San Diego, Calif.

[73] Assignee: Cubic Automatic Revenue Collection Group, San Diego, Calif.

[21] Appl. No.: 607,305

[22] Filed: Oct. 31, 1990

Related U.S. Application Data

[63] Continuation of Ser. No. 274,335, Nov. 21, 1988, abandoned.

[51] Int. Cl.[5] ............................................. G07B 15/02
[52] U.S. Cl. .................................. 235/384; 235/437; 364/467
[58] Field of Search ............... 235/384, 380, 382, 377, 235/378, 436, 437, 449, 493, 438; 364/467

[56] References Cited

U.S. PATENT DOCUMENTS

| | | | |
|---|---|---|---|
| 3,501,622 | 3/1970 | Weir et al. | 235/384 |
| 3,859,507 | 1/1975 | Konya | 235/384 |
| 3,870,866 | 3/1975 | Halpern | 235/384 |
| 3,958,103 | 5/1976 | Oka et al. | 235/384 |
| 4,605,843 | 8/1986 | Aubrey | 235/475 |
| 4,798,942 | 1/1989 | Aubrey | 235/384 |
| 4,866,661 | 9/1989 | de Prins | 235/382 |
| 4,868,376 | 9/1989 | Lessin et al. | 235/380 |

FOREIGN PATENT DOCUMENTS 2152720 8/1981 United Kingdom ................ 235/384

OTHER PUBLICATIONS

New Toll Collection System by Okajima et al Toshiba Review No. 125 Jan.-Feb. 1980.

*Primary Examiner*—John W. Shepperd
*Assistant Examiner*—Edward H. Sikorski
*Attorney, Agent, or Firm*—Brown, Martin, Haller & McClain

[57] ABSTRACT

An access control ticket having three fields of data, a first field of fixed data, a second field of variable data, and a third field of variable data is read and information processed by a microprocessor. The microprocessor determines the validity of information on the ticket data fields and which of the variable fields has older data. Writing only occurs on (over) the variable field with invalid or older data. Upon subsequent use, the ticket contains current access data (just written) and last previous access data, as well as fixed field data. This added data (past use) can be used for statistical analysis or other purposes. More importantly, the added data field reduces read/write reliability problems. One improperly written variable data field does not invalidate ticket, only the last variable data entry. The microprocessor is programmed to overwrite invalid data in one of the variable data fields during the next use. Since the ticket still has the fixed data field and a prior use variable data field, no human intervention, repair of access control devices (for single failures), or new tickets are required. The location of variable use data can also be segregated from fixed data to further enhance reliability. This reduction in failures and tolerance of single non recurring errors allows hand held swipe type read/writer to be utilized for mass transit applications. Access is quick, avoiding manual ticket insertion, grabbing, transport and return.

1 Claim, 2 Drawing Sheets

FARE CARD READ-WRITER WHICH OVERWRITES OLDEST OR INVALID DATA

This is a continuation of application Ser. No. 07/274,335, filed Nov. 21, 1988, now abandoned.

FIELD OF THE INVENTION

This invention relates to article registers, more specifically to ticket or fare card read/writers and a method to process patrons, allow access and collect fares for mass transit systems.

BACKGROUND OF THE INVENTION

The primary objectives of a mass transit access control ticket read-writer system are to: 1) read and record a valid ticket's fare value and information; 2) write altered fare value and other information on the valid ticket; 3) allow quick and convenient entry/exit of persons with a valid ticket, and 4) reject invalid or insufficient fare tickets. Since the patron process may have to handle very large volumes of persons, it also must be fast acting and very reliable. It should also be light weight (to minimize structural support required), easy to maintain, rugged in construction, pleasing in appearance and low in cost. When the read/writer is used in each of the two operating modes (entrance and exit), a minimum of effort to convert from one mode to another mode is also desirable.

Current read/writer devices and methods may accomplish several of these objectives (in one or both of the operating modes) well, but other objectives poorly. A basic type of read/writer system for mass transit applications includes the mechanical transport of the ticket which is entered by the mass transit passenger. The ticket, which incudes a magnetic or other encodable strip of material, is carried to a read head. The ticket may be immobilized or transported over the read head at a fixed speed. The read head detects or reads the information stored on the ticket's magnetically encoded tape or strip and the information is transmitted to a microprocessor.

If a valid ticket with sufficient fare is read, the system then encodes new, variable data on the ticket's tape or strip. This variable data typically includes date, location and reduced ticket/fare value. This writing of new variable data is typically validated by a second read head which verifies (read and compare) the new information. Any previous variable data on the ticket is overwritten by the new data. The ticket's encoded tape is typically segregated into fixed data (not normally written over) and variable data (normally written over). Control signals to lock and unlock an access control barrier may be provided via cables from the microprocessor.

The ticket may be used once per passage, if multiple fare or exit control is not required. Remote or supervisory locking/unlocking and ticket return control signals may also be given manually. An example of this type of system is illustrated in U.S. Pat. No. 3,212,615. versions of this basic type of mechanical transport of a ticket to a read/writer has been implemented in the Washington DC Metro system, the San Francisco BART system, the Singapore and in other mass transit systems.

An alternate type of access system based on a read only system is known conceptually, but has not been applied in this field, in the applicant's knowledge. This type of read only system uses a "swipe" reader, where ticket transport is accomplished manually by the passenger/ticket holder as he/she passes the hand held ticket over a read head or decoder. The ticket may be magnetically or otherwise encoded. If a valid ticket (single use) is detected, access is provided. In a read only system, encoded data is not over written. This basic type of read only system has been implemented in the New York City (N.Y.) and Baltimore (Md.) mass transit systems. Theoretically, this type of read only system could be applied to a multiple use application, but would require large, sophisticated real time central data processing, tracking and communication systems to each port. No known application of the multiple-use (where the fare value is deducted) read only system concept to mass transit is known to the applicant.

The prior art approaches to ticket read/writing have many limitations, especially when implemented in mass transit applications. The mechanical transport of tickets introduces several elements which are susceptible to failure and unreliable operation. The mechanical transport system can fail, be jammed, mechanically damage the ticket, magnetically alter the data stored on the ticket, may incorrectly place the ticket or allow ticket to move (when it should be immobilized), or may move the ticket across the read head at other than an acceptable speed. This improper ticket placement or movement can cause the reader to incorrectly interpret the stored information and/or allow the writer to erroneously erase fixed data and/or fail to write proper information on the ticket's strip. Since these failures may occur twice for each trip (entrance and exit modes of operation), and each ticket may be used for multiple trips (advance sale of fares recorded on single ticket) and millions of passengers may be using the mass transit system daily, it can be seen that a very large number of problems can occur, even if the mechanical transport system is statistically reliable (i.e.: experience a small percentage failure rate).

Mechanical systems tend to slow the passage of ticket holding passengers through the access control device. The passenger must locate the ticket entrance slot, determine the proper ticket orientation and edge to be inserted, reorient the ticket if necessary, and insert the proper edge of the ticket into the slot. The mechanical transport system must then grab the ticket and move it to the read/writer head(s). A minimum time of residence over the reader is required to read, process and write data. The ticket then has to be mechanically transported for either return to the passenger or rejected for disposal. In addition to delay, the mechanical passenger ticket transport and handling system interface presents other opportunities for unreliable operation, such as the accidental insertion of materials other than tickets into the ticket slot, contamination of an otherwise valid ticket being transferred to the read head, malfunction of the transport mechanism, multiple simultaneous ticket entry, and the passenger's failure to take a returned ticket.

Even with an ideal user with a contamination free valid ticket, the moving mechanical parts and critical clearances (ticket grabbing, lateral ticket control during read/writer operation, etc.) reduce reliability when compared to a swipe read system. The required added mechanical devices inherent in a mechanical ticket transport also consume more space, mechanical supports and electric power, thus increasing the cost of the access control system.

The multiplicity of elements, unfamiliar users, added processing time, weight and space detract from the objectives of reliability, rapid patron processing and convenient access/exit. As an example, one mass transit system with a mechanical ticket handling type of system experiences approximately 300 failures per day. These failures typically require manual intervention into the access control system, the reissuing of tickets and/or the refunding of fares. In addition to the direct cost of handling these failures and delays, the time required to repair the transport mechanism tends to cause a reduction in ticket sales, increases ticket purchase/delays, and encourages attempts to bypass the malfunctioning ticket/access control systems.

To the best of the applicant's knowledge the swipe writer has not been successfully implemented in the mass transit application. The swipe writers that exist at present can and do corrupt tickets in the operation cycle. This is primarily a result of the difficulty of adequately controlling the location of the ticket during the hand-held write mode of operation. If the magnetic strip is divided into read only (fixed data field) and read/write (variable data field) areas, writing must be precluded from fixed data field. Lateral misslocation of ticket or strip, insufficient time/excessive speed of ticket across read/writer heads, and excessive ticket distance from read/writer head are only some of the causes of possible error. In a mass transit application, passengers are unlikely to consistently and correctly place and retain the ticket over the read/write head. The inherent lack of ticket control and other problems can be expected to result in unacceptable failure rates (failure to properly write and verify writing) for this type of system.

What is needed is a new type of swipe read/writer that is significantly less susceptible to writing and verification errors. This type of system could be used with mechanical or hand held ticket handling systems, but would avoid the many problems and disadvantages of the prior art mechanical ticket read write systems. None of the prior art that the applicant is aware of provides the reliability of the present invention.

SUMMARY OF THE INVENTION

The principal and secondary objects of the invention are:

To provide a means to read and record ticket data without corruption independent of patron behavior;

To provide additional data on the ticket;

To provide an access control means which minimizes required user action; and

To provide an access control means which requires little or no manual interference with the access control system.

These and other objects are achieved by means to rewrite tickets without corruption as a potential part of the rewrite process. Rewrite means processes a ticket having three fields of data, a first field of fixed data, a second field of variable data, and a third field of variable data. The second and third data fields alternately contain the most recent and the next most recent use transaction. After reading data from all three fields, the microprocessor determines the validity of the ticket and which variable field has older data. The older data or the invalid data, in whatever variable data field they are found, are then overwritten. The ticket's subsequent use information may also be verified. The ticket now contains (fixed) original use information, most recent access data (just written) and next most recent access data. This added use data can be used for statistical analysis or other purposes.

More importantly, the added data field improves reliability. One improperly written variable data field does not invalidate the ticket, only the last entry. The access port microprocessor is programmed to overwrite a reading/writing failure (invalid data) in variable data field during the next use. Since the ticket still has the fixed data field and a prior use variable data field, no human intervention, repair of access control devices, or new tickets are required if a single failure is encountered. Access is quick, avoiding manual ticket insertion, grabbing, transport and return. Ticket write errors are now easily tolerated, instead of causing significant direct and indirect costs as in prior art systems.

DESCRIPTION OF THE PREFERRED EMBODIMENT

Figure 1:
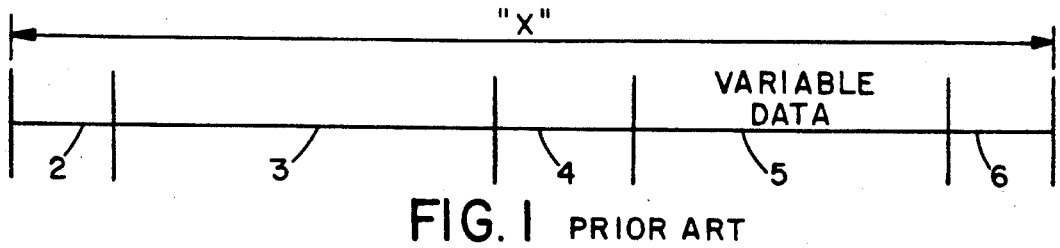
FIG. 1 is a diagram of the prior art ticket read/writer fields.

FIG. 1 shows a prior art format of a read/writer ticket data fields. The dimension "x" is the length of a strip of magnetic tape or film within a ticket. The ticket is purchased for access to and exit from a controlled access facility or mass transit system. Zone 2 is a header field of information, sometimes referred to as handshake data. This field allows the ticket reader to recognize the following information as related to access and/or exit to a controlled access facility. The fixed data or fixed field information (FF) is located at zone 3. This type of data can include when/where the ticket was purchased, how much did the ticket cost, period and other limitations (e.g.: off peak hours elderly ticket purchaser). Zone 4 is a default or spacer zone. This essentially separates zone 3 data from zone 5's variable data. Variable data or variable field information (VF) in zone 5 may include: most recent location and type of use of the ticket (e.g.: entered express station at main street); time of last use; and value of ticket remaining. Zone 6 holds trailer information, or end of data information. This notifies the reader that no more information is present.

Figure 2:
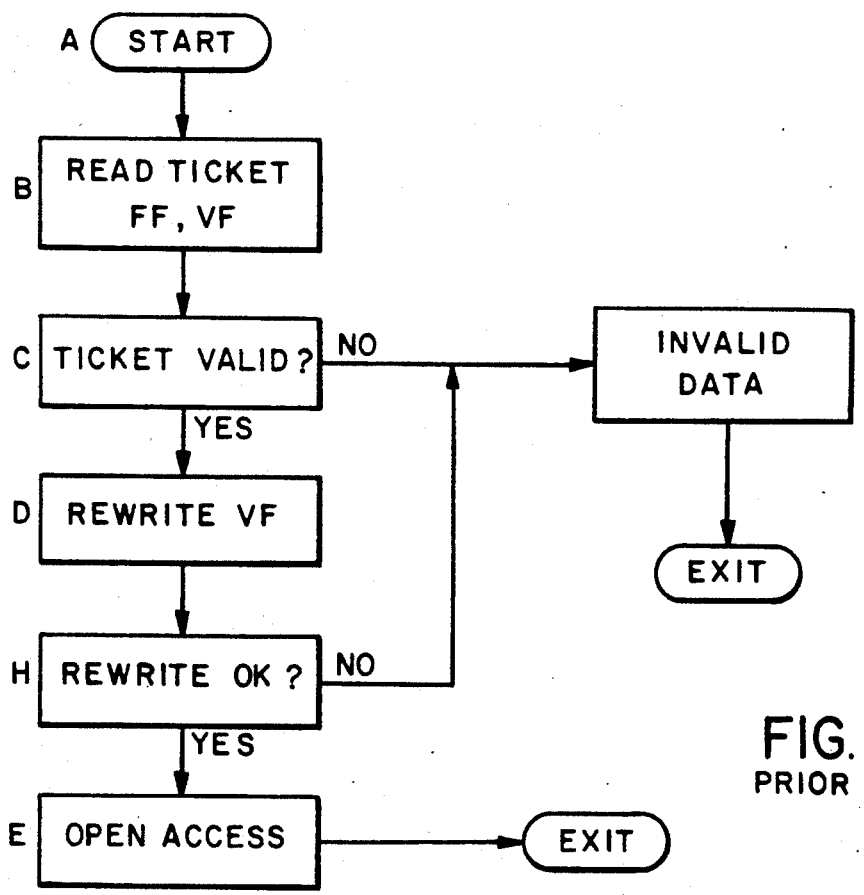
FIG. 2 is a prior art implementation of a ticket read/writer process.

FIG. 2 shows a prior art process flow diagram using these ticket data fields. First step "A" or start is accomplished by inserting the ticket containing the magnetically encoded data on the zones previously described into a read/writer. The fixed (FF) and variable (VF) information on the ticket are read at step "B". The next step "C" tests whether the information in the VF and FF zones previously read is valid data. If the data is valid, the next step "D" rewrites the variable zone data (i.e.: current time, location, and type of use). This rewriting obliterates the previous VF data, replacing it with the current variable information. The next step "H" verifies that the rewrite of the variable field was successfully accomplished. If the rewrite was not correctly executed an invalid data exit is performed (G). If the rewrite was verified, the next step "E" opens the access gate or other structure allowing facility access- /exit. This is followed by step "F638 which ends or exits the process and returns or expels the ticket from the reader.

If the data was not valid at step "C", or the rewrite was unsuccessful (H), the next process step "G", records or alerts to the existence of invalid data, followed by the process ending (process exit) and expulsion of the ticket at step "F". No facility entry or exit is granted and no rewrite of ticket is typically accomplished. Thus in a multi-use ticket, a single failure such as a partial rewrite, can invalidate any future use of the ticket and/or require human intervention to allow facility access or exit.

Figure 3:
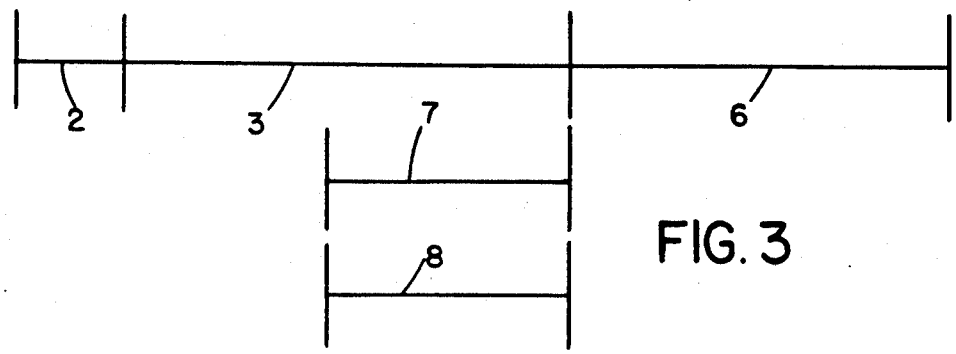
FIG. 3 shows a preferred embodiment of a read/writer access control ticket data fields.

FIG. 3 shows a preferred embodiment of a read/-writer access control ticket data fields. Zones 2 (header information), 3 (fixed data), and 6 (trailer) on the magnetically encoded strip are similar in function to the prior art described in FIG. 1. Zones 7 (VF1) and 8 (VF2) alternately contain either the most recent use variable data or next most recent use variable data. One or the other of these VF1 (zone 7) or VF2 (zone 8) zones will contain data similar to zone 5 of FIG. 1. However, the variable information in VF1 and VF2 are now required to contain time/date information, which may or may not have been present in Zone 5 of FIG. 1. The other one of these VF1 or VF2 zones will contain the information that was obliterated in the act of writing the information in zone 5 of the prior art. The location of the VF1 and VF2 fields is adjacent rather than in-line in the preferred embodiment, and therefore may also contain added timing, handshake and trailer information. An alternate embodiment would extend the dimension "x" as shown in FIG. 1 to incorporate the added VF strip of information.

Figure 4:
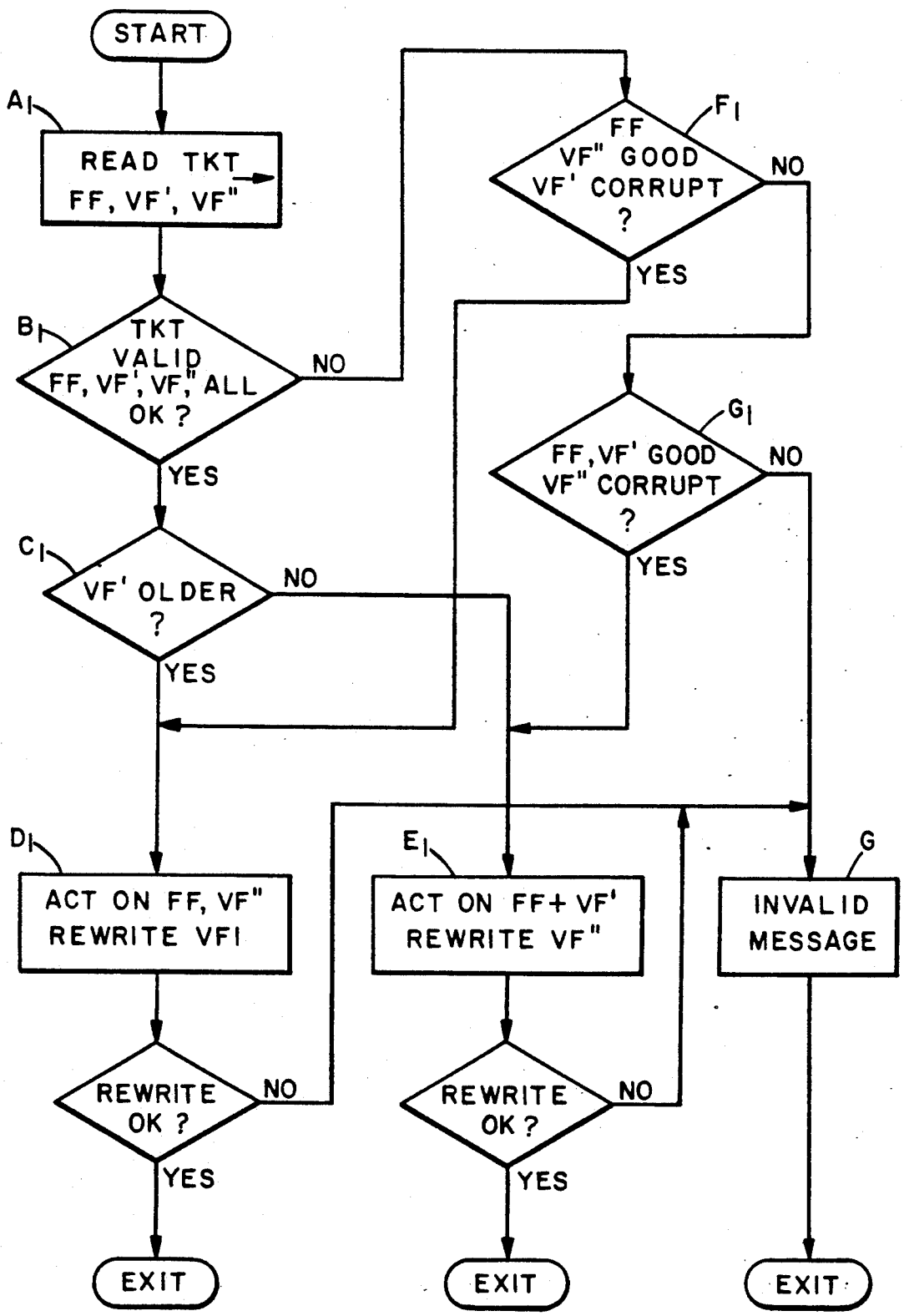
FIG. 4 is a process flow diagram of the preferred read/writer access control process.

FIG. 4 is a process flow diagram of the read/writer access control process. The process is generally similar to the one describes in reference to FIG. 1. Step A1 reads the ticket, now including FF, VF1, and VF2 zones. The test step "B1" is also similar, but all three data fields (after handshake) must be valid in order to proceed with a new selection step "C1". This selection step "C1" tests if the variable data in VF1 is older than the variable data in VF2. If VF1 data is older than the data in VF2, first action step "D1" occurs which is similar to steps "E" and "F" of FIG. 2, but only the variable data VF1 in zone 7 (see FIG. 3) is written over with current information. Access/entry is granted, the ticket returned and the process ended.

If the selection step "C1" did not show older data in VF1, then only the data in VF2 is rewritten at step "E1", obliterating the data existing in that zone. Step "E1" similarly grants access/exit, returns ticket and ends/exits the process. If the validity at step "B1" does not indicate all valid data, VF1 data test step "F1" is accomplished. If FF and VF2 data are both valid, first action step "D1" is accomplished, rewriting the data on VF1, granting access/exit, returning ticket and ending process. If FF and VF2 data are not valid, VF2 data test step "G1" is accomplished. If FF and VF1 data are both valid, second action step "E1" is taken. This second action step "E1" rewrites only the data on VF2, grants access, returns ticket and ends process. If FF and VF1 data is not valid, invalid step "G" again occurs, similar to FIG. 1.

Comparison to prior art shows distinctive features of the process. Failure of either variable data field does not required human or operator interference. The next most recent data is now available for the facility or access control system to record, trend or otherwise act upon as well as the most recent use data. The rewriting of older data allows unlimited multiple use as well as tolerating single time failures. Thus a single malfunctioning entry read/write unit in a mass transit system which could invalidate thousands of tickets before discovery and correction, now invalidates none.

While the preferred embodiment of the invention has been shown and described, changes and modifications may be made therein within the scope of the appended claims without departing from the spirit and scope of this invention.

What is claimed is:

1. A computer-implemented data processing method for coding and decoding first use and subsequent information related to access to a controlled access facility on a codable three section ticket, comprising the steps of:
   (1) coding first use information on a first data field of a codable three section ticket and subsequent use information on at least one of a second data field and a third data field of said codable three section ticket, the coded subsequent use information including the date and time of the use;
   (2) decoding the information on said first data field, said second data field, and said third data field;
   (3) upon subsequent use, first testing of each of said data fields for validity of decoded information;
   (4) if valid information is detected by said first testing in all three data fields, second testing to determine whether said information in said second data field is older than said information in said third data field;
   (5) if second data field information is older than said information on said third data field by said second testing, coding said subsequent use information onto said second data field, allowing access and exiting process;
   (6) if second data field information is not older than said information on said third data field by means of said second testing, coding said subsequent use information on said third data field, allowing access and exiting process;
   (7) if said first testing does not determine that valid information is found in all of the three data fields, third testing to determine whether said information on said first and third data field is valid;
   (8) if said information by said third test means is valid, coding said subsequent use information onto said second data field, allowing access and exiting process;
   (9) if said information by said third test means is not valid, fourth testing of validity of said information on said first and second data fields;
   (10) if said information by said fourth test means is valid, coding said subsequent use information onto said third data field, allowing access and exiting process; and
   (11) if said information by said fourth test means is not valid, indicate invalid ticket and exit process.

* * * * *